(12) United States Patent
Zheng

(10) Patent No.: US 6,634,609 B2
(45) Date of Patent: Oct. 21, 2003

(54) UNIVERSAL ACCESSORY ADAPTER FOR COLLAPSIBLE OUTDOOR FURNITURE

(76) Inventor: Edward Zheng, 1736 Wright Ave., La Verne, CA (US) 91750

( * ) Notice: Subject to any disclaimer, the term of this patent is extended or adjusted under 35 U.S.C. 154(b) by 0 days.

(21) Appl. No.: 09/912,120

(22) Filed: Jul. 23, 2001

(65) Prior Publication Data

US 2003/0016991 A1 Jan. 23, 2003

(51) Int. Cl.[7] .................................................. A47C 4/00
(52) U.S. Cl. ................... 248/277.1; 403/385; 403/345; 403/346; 403/373; 297/45; 297/42
(58) Field of Search .................. 403/346, 345, 403/287, 385, 373, 374; 248/277.1, 485, 518, 534, 229.1, 229.13, 229.14, 229.15, 511, 122.1, 472, 479; 297/42, 45

(56) References Cited

U.S. PATENT DOCUMENTS

| | | | | |
|---|---|---|---|---|
| 521,355 A | * | 6/1894 | Yapp | |
| 602,662 A | * | 4/1898 | Miller | |
| 636,034 A | * | 10/1899 | Geudtner | |
| 694,888 A | * | 3/1902 | Pfluger | |
| 903,733 A | * | 11/1908 | Lampert | |
| 1,345,910 A | * | 7/1920 | Cozart | |
| 1,507,094 A | * | 9/1924 | Schoenborn | |
| 4,660,870 A | * | 4/1987 | Donley | 285/419 |
| 4,887,786 A | * | 12/1989 | Stokes | 248/512 |
| 5,518,218 A | * | 5/1996 | Leonard | 248/530 |
| 5,836,327 A | * | 11/1998 | Davis | 135/16 |
| 6,439,659 B1 | * | 3/2000 | Neubauer, Jr. | 297/188.01 |
| 6,193,308 B1 | * | 2/2001 | Hwang | 297/171 |

* cited by examiner

*Primary Examiner*—Anthony Knight
*Assistant Examiner*—Lisa Bannapradist
(74) *Attorney, Agent, or Firm*—Raymond Y. Chan; David and Raymond Patent Group

(57) ABSTRACT

A universal accessory adapter, which is adapted for attaching to a collapsible outdoor furniture, includes a supporting device for rigidly supporting an accessory item, at least a connector for detachably attaching the supporting device to a frame leg of the collapsible outdoor furniture, and a foldable frame arranged for selectively folding the supporting device from a folded position to an unfolded position. In which, in the folded position, the supporting device is moved to a position close to the frame leg of the collapsible outdoor furniture, and in the unfolded position, the supporting device is moved away from the frame leg of the collapsible outdoor furniture, so as to spacedly mount the supporting device with respect to the frame leg of the collapsible outdoor furniture. Therefore, the universal accessory is substantially supported by the collapsible outdoor furniture, so as to rigidly support the accessory item on the universal accessory adapter.

36 Claims, 11 Drawing Sheets

UNIVERSAL ACCESSORY ADAPTER FOR COLLAPSIBLE OUTDOOR FURNITURE

BACKGROUND OF THE PRESENT INVENTION

1. Field of Invention

The present invention relates to a collapsible outdoor furniture, and more particularly to a universal accessory adapter for collapsible outdoor furniture, which is adapted for rigidly supporting an umbrella, a side table, or the like.

2. Description of Related Arts

Since a conventional collapsible outdoor furniture can be quickly and easily unfolded for use and folded into a compact unit for carriage, a user can carry the foldable chair or table to everywhere such as campground or beach. As shown in FIG. 1, a conventional foldable chair is constructed by a pair of vertical back legs to provide a back frame and a seat frame for supporting a fabric seat. The back frame and the seat frame are arranged in such a manner that the foldable chair can be easily opened to provide a rigid cross-support for use and be folded up for storage.

Since the foldable chair or foldable table is usually used outdoors, the user may need an outdoor umbrella for shading purpose, especially at the afternoon. However, such outdoor umbrella comprises a stand having a predetermined weight for stabilizing the outdoor. It is a hassle for the user to carry the outdoor umbrella everywhere.

From sunrise to sunset, the sunlight fell on the ground keeps changing at the time. In order to obtain the optimum shade from the outdoor umbrella, a user has to move the entire outdoor umbrella back and forth. Due to the weight of the stand, which is approximately 50 to 60 bounds, the user always has difficulty to move the outdoor umbrella. Otherwise, the user may merely move the foldable chair under the shading area of the outdoor umbrella.

Accordingly, some users may tight or secure a bottom end of an umbrella directly to the frame of the foldable chair or table to provide shading, so that the umbrella can move with the foldable chair of table. However, there is no such product on sale in market because this idea contains two unsolvable drawbacks. First, the umbrella is positioned too close to the user who sit on the foldable chair that may obstruct the movement of the user and cause uncomfortable feeling to the user since there substantially has no room between the umbrella and the foldable. Second, the foldable chair or table cannot foldable up with the umbrella attached thereto, so that the user must separate the umbrella before folding up or unfolding the foldable chair or table.

For convenience, the user may use a portable outdoor umbrella which is lightweight. However, the portable outdoor umbrella must require a rigid stand to support thereof. When the wind blows, the foldable awning of the portable outdoor may fall down accidentally, especially when a young child sits closed to the outdoor umbrella, so as to cause an unwanted injury to the young child.

SUMMARY OF THE PRESENT INVENTION

A main object of the present invention is to provide a universal accessory adapter for collapsible outdoor furniture, which is adapted for rigidly supporting an accessory item such as an umbrella, a side table, or the like.

Another object of the present invention is to provide a universal accessory adapter for collapsible outdoor furniture, wherein the universal accessory can be quickly and easily folded into a compact unit for carriage and storage, and unfolded for use.

Another object of the present invention is to provide a universal accessory adapter for collapsible outdoor furniture, which has a simple construction that every individual is able to operate the universal accessory adapter in a folding and an unfolding manner.

Another object of the present invention is to provide a universal accessory adapter for collapsible outdoor furniture, wherein the universal accessory adapter does not require to alter the original structural design of the collapsible outdoor furniture, so as to minimize the manufacturing cost of incorporating the universal accessory adapter with every conventional outdoor furniture having a vertical back frame leg.

Another object of the present invention is to provide a universal accessory adapter for collapsible outdoor furniture, wherein when the universal accessory adapted is arranged to detachably attach to a vertical frame leg, such as the back leg of the chair frame of a foldable chair or the stand leg of the table frame of a foldable table, the foldable chair or table is still able to be operated to fold-up or unfold while the universal accessory adapter is still attached thereto. In other words, the user may select to let the universal accessory adapter remains attaching to the collapsible outdoor furniture all the time, no matter it is unfolded for use or folded up for storage or transportation, i.e. the universal accessory adapter can become an attached component of the collapsible outdoor furniture.

Another object of the present invention is to provide a universal accessory adapter for collapsible outdoor furniture, wherein the weight of the user applied on the collapsible outdoor furniture will further ensure the construction of the universal accessory adapter for rigidly support an accessory item thereon.

Another object of the present invention is to provide a universal accessory adapter for collapsible outdoor furniture, wherein no expensive or complicate mechanical structure is required to employ in the present invention in order to achieve the above mentioned objects. Therefore, the present invention successfully provides an economic and efficient solution for rigidly supporting by the collapsible outdoor furniture and providing a reinforced support configuration to support the desired accessory item.

Accordingly, in order to accomplish the above objects, the present invention provides a universal accessory adapter for collapsible outdoor furniture which comprises a back frame having at least a vertical back frame leg and a seat frame to construct a fabric seat thereon.

The universal accessory adapter, adapter for rigidly mounting to the back frame leg of the collapsible outdoor furniture, comprises means for rigidly supporting an accessory item, at least a connector for detachably attaching the supporting device to the back frame leg of the collapsible outdoor furniture, and a foldable frame arranged for selectively folding the supporting device from a folded position to an unfolded position. In which, in the folded position, the supporting device is moved to a position close to the back frame leg of the collapsible outdoor furniture, and in the unfolded position, the supporting device is moved away from the back frame leg of the collapsible outdoor furniture, so as to spacedly mount the supporting device with respect to the back frame leg of the collapsible outdoor furniture.

Alternatively, the universal accessory adapter is built-in to the collapsible outdoor furniture in such a manner that the collapsible outdoor furniture with the universal accessory adapter can be quickly and easily unfolded for use and folded into a compact unit for carriage.

DETAILED DESCRIPTION OF THE PREFERRED EMBODIMENT

Figure 1:
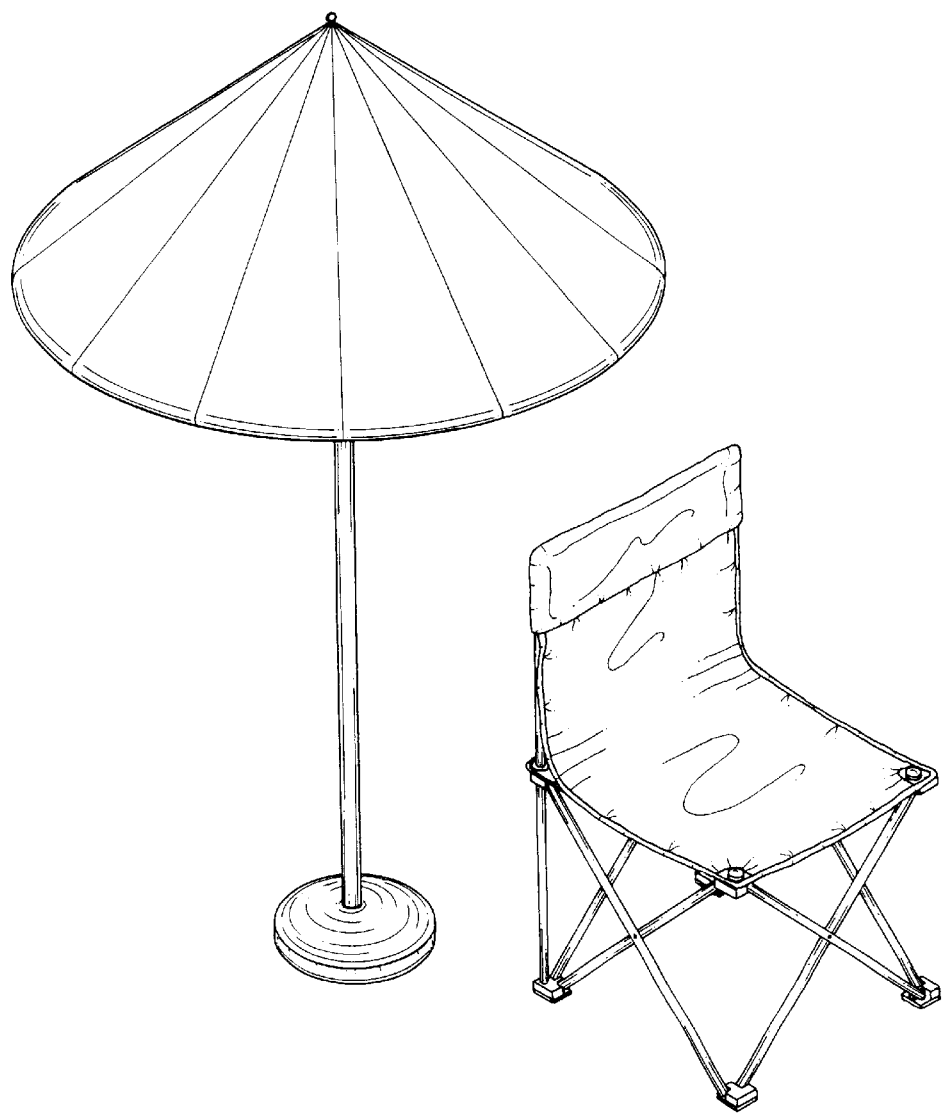
FIG. 1 is a perspective view of a conventional foldable chair incorporated with an outdoor umbrella.
Figure 2:
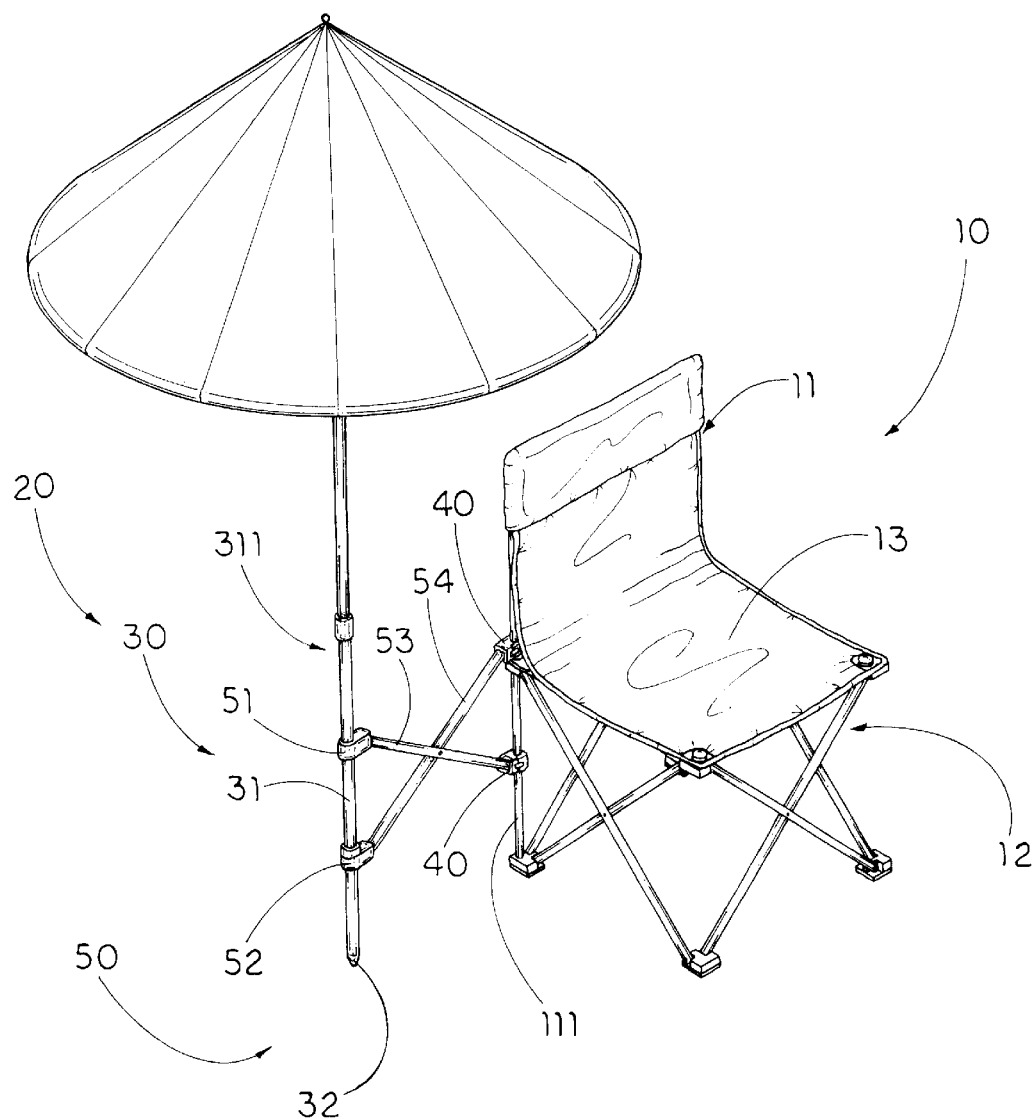
FIG. 2 is a perspective view of a collapsible outdoor furniture incorporated with a universal accessory adapter according to a first preferred embodiment of the present invention.

Referring to FIG. 2 of the drawings, a universal accessory adapter 20 incorporated with a collapsible outdoor furniture 10 is illustrated. The collapsible outdoor furniture 10, such as a standard foldable furniture, is constructed by a plurality of construction bars pivotally connected together wherein the universal accessory adapter 20 is adapted for attaching to a vertical frame leg of the collapsible outdoor furniture 10.

Generally, the collapsible outdoor furniture 10, which is constructed by a plurality of frame legs 111, comprises a back frame 11 having at least the vertical back frame leg and a seat frame 12 to construct a fabric seat 13 thereon. The back frame 11 and the seat frame 12 are arranged in such a manner that the collapsible outdoor furniture 10 can be easily opened to provide a rigid cross-support for use and be folded up for storage.

Figure 3:
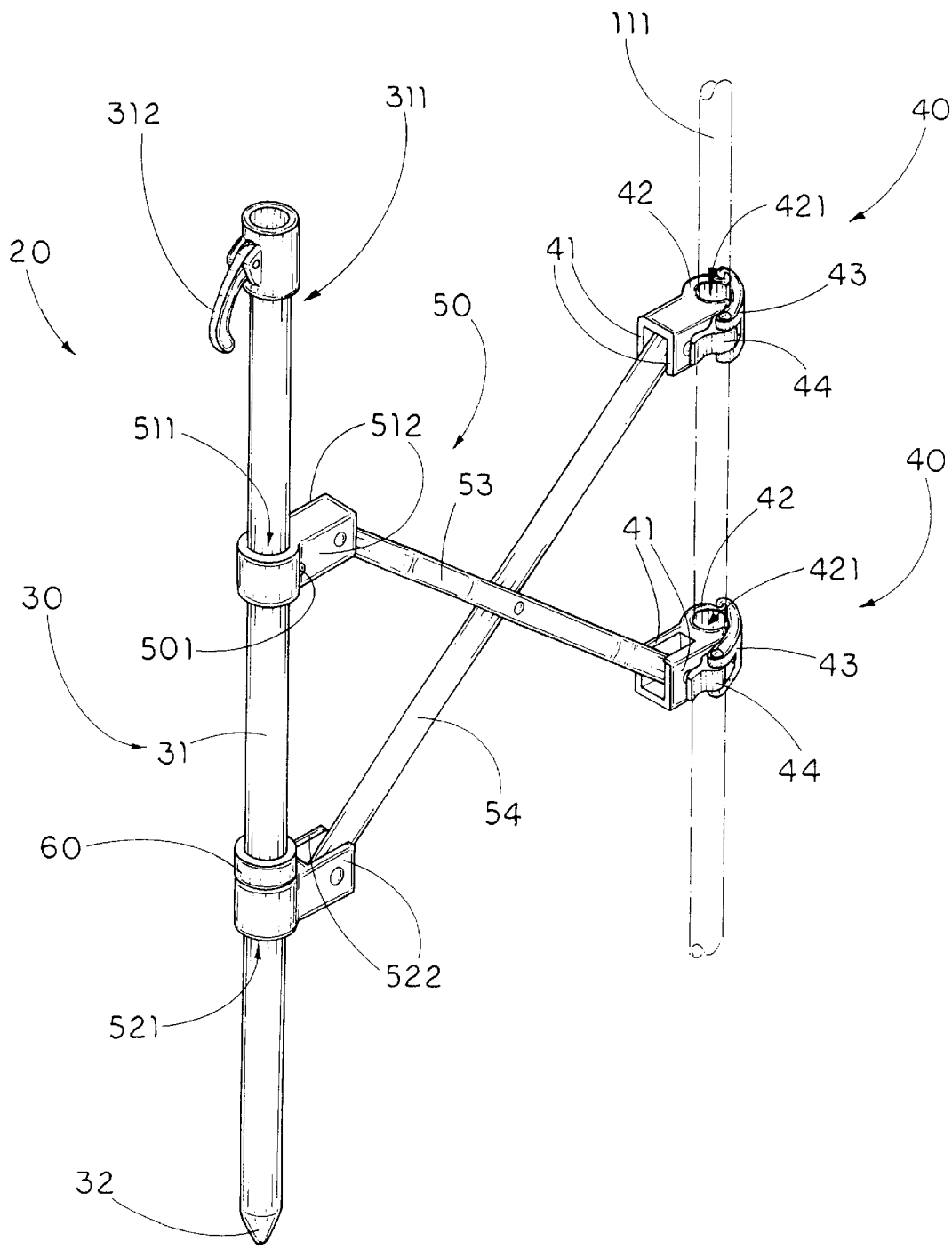
FIG. 3 is a perspective view of the universal accessory adapter mounted on the collapsible outdoor furniture according to the above first preferred embodiment of the present invention.
Figure 4A:
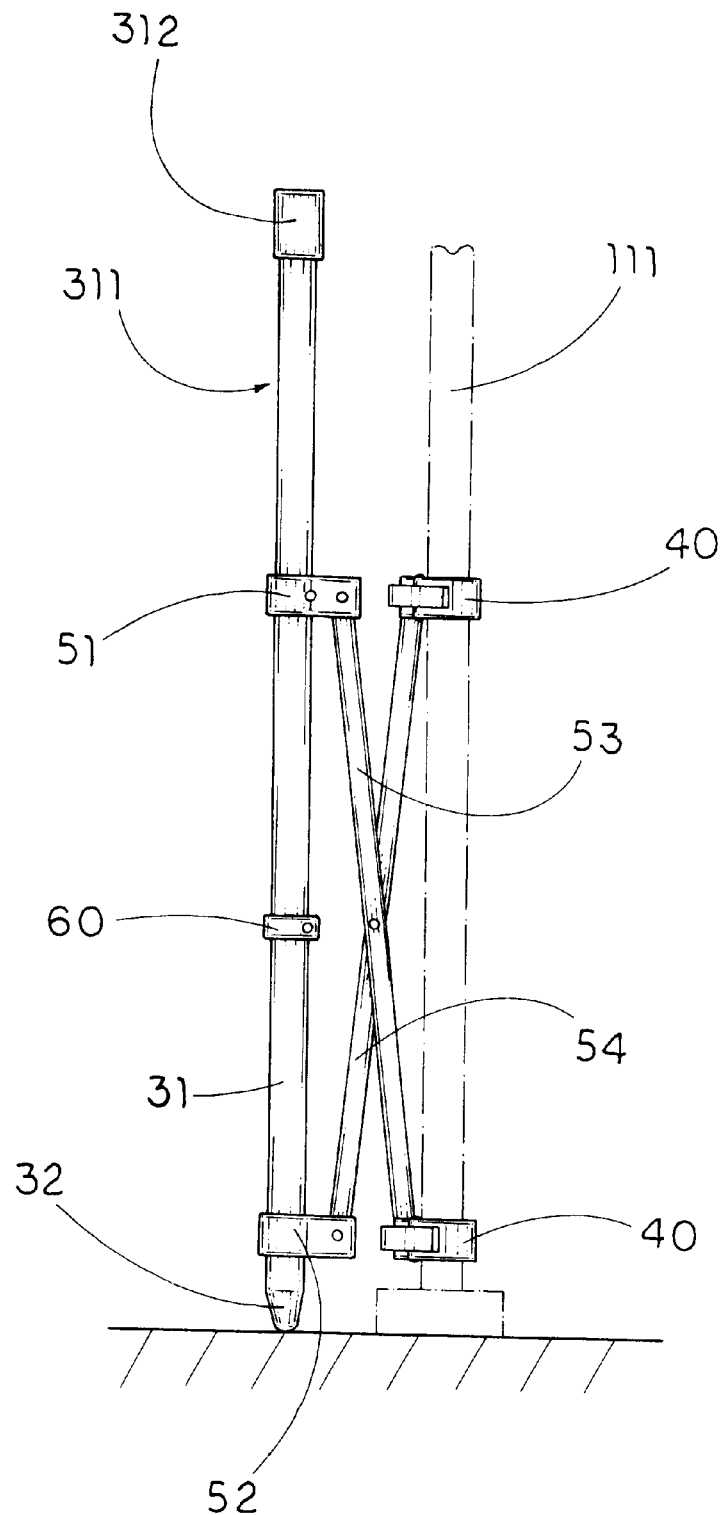
FIG. 4A is a side view of the universal accessory adapter in a folded position according to the above first preferred embodiment of the present invention.

As shown in FIG. 3, the universal accessory adapter 20 comprises means 30 for rigidly supporting an accessory item, at least a connector 40 for detachably attaching the supporting device 30 to the back frame leg 111 of the collapsible outdoor furniture 10, and a foldable frame 50 arranged for selectively folding the supporting device 30 from a folded position to an unfolded position. In which, in the folded position as shown in FIG. 4A, the supporting device 30 is moved to a position close to the back frame leg 111 of the collapsible outdoor furniture 10, and in the unfolded position as shown in FIG. 4B, the supporting device 30 is moved away from the back frame leg 111 of the collapsible outdoor furniture 10, so as to spacedly mount the supporting device 30 with respect to the back frame leg 111 of the collapsible outdoor furniture 10.

According to the preferred embodiment, the supporting device 30 comprises an elongated supporting shaft 31 having an adapter portion 311 for rigidly mounting the accessory item thereto. The supporting shaft 31 is made of rigid material such as metal to provide a substantial structure to support the accessory item.

Figure 4B:
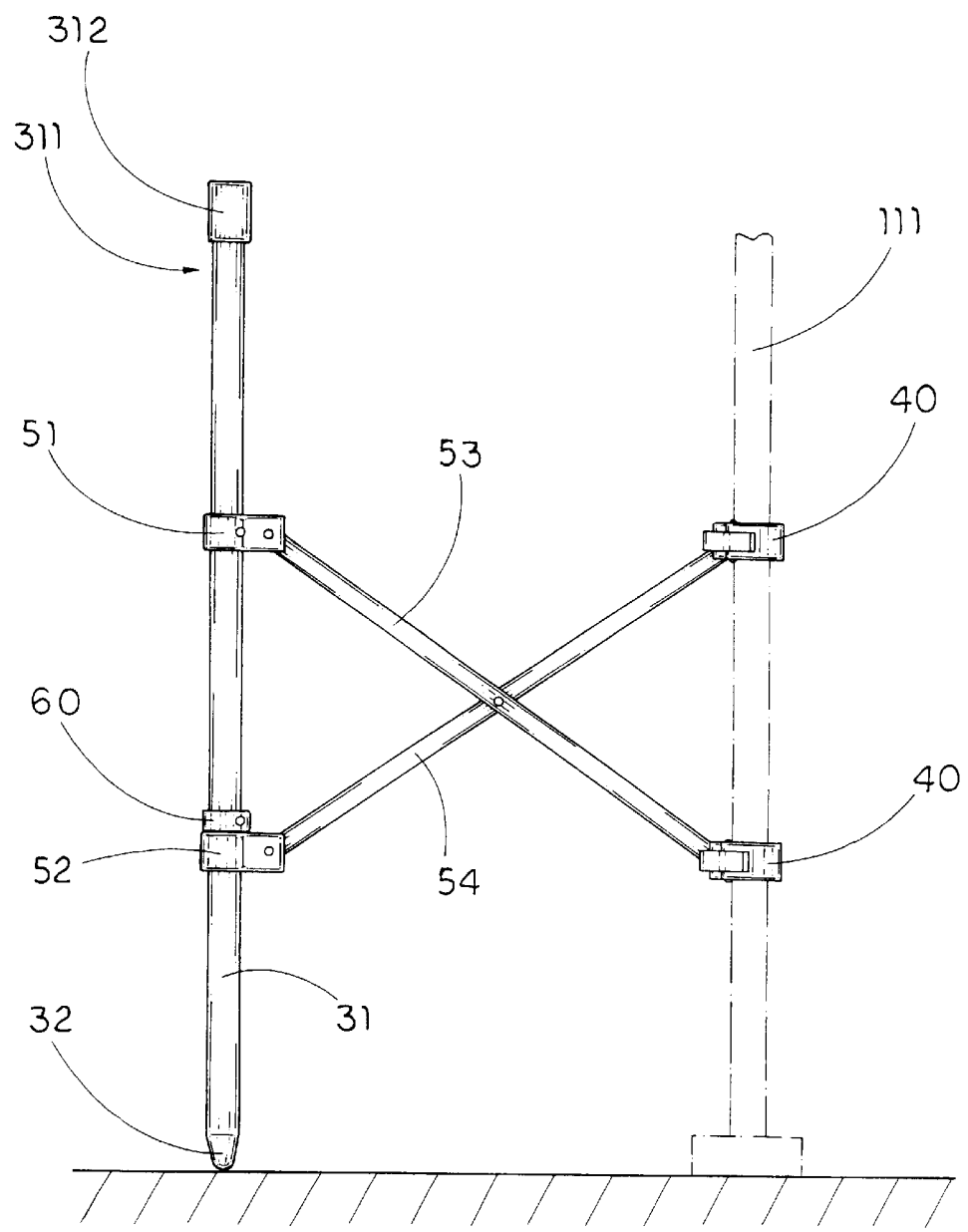
FIG. 4B is a side view of the universal accessory adapter in an unfolded position according to the above first preferred embodiment of the present invention.

The supporting device 30 further comprises a ground support 32 provided on a bottom end of the supporting shaft 31 for biasing against a ground, so as to further support the accessory item in stabilized manner, as shown in FIG. 4B. Accordingly, the bottom end of the supporting shaft 31 having a tapered shaped is shaped to construct the ground support 32 for standing on the ground. Alternatively, the ground support 32 having a tapered shaped can be mounted to the bottom end of the supporting shaft 31 to achieve the above mentioned purpose.

The foldable frame 50 comprises a first joint 51 affixed to the supporting shaft 31, a second joint 52 slidably attached to the supporting shaft 31, and a first and second pivot arms 53, 54 pivotally connected with each other in cross manner to form a "X" structure, wherein each of the first and second pivot arms 53, 54 has an outer end pivotally connected to the respective first and second joints 51, 52 and an inner end pivotally connected to the connecter 30.

Accordingly, the first joint 51 has the same structural design of the second joint 52 wherein each of the first and second joints 51, 52 has a sliding through hole 511, 521 for the supporting shaft 31 slidably passing through and two parallel arms 512, 522 to pivotally connect the respective outer end of the first and second pivot arms 53, 54 therebetween. In order to prevent an unwanted movement of the first joint 51 along the supporting shaft 31, the first joint 51 is securely affixed on the supporting shaft 31 via a rivet 501. However, the second joint 52 is capable of freely sliding on the supporting shaft 31 to adjust the folding position of the supporting shaft 31.

Figure 5:
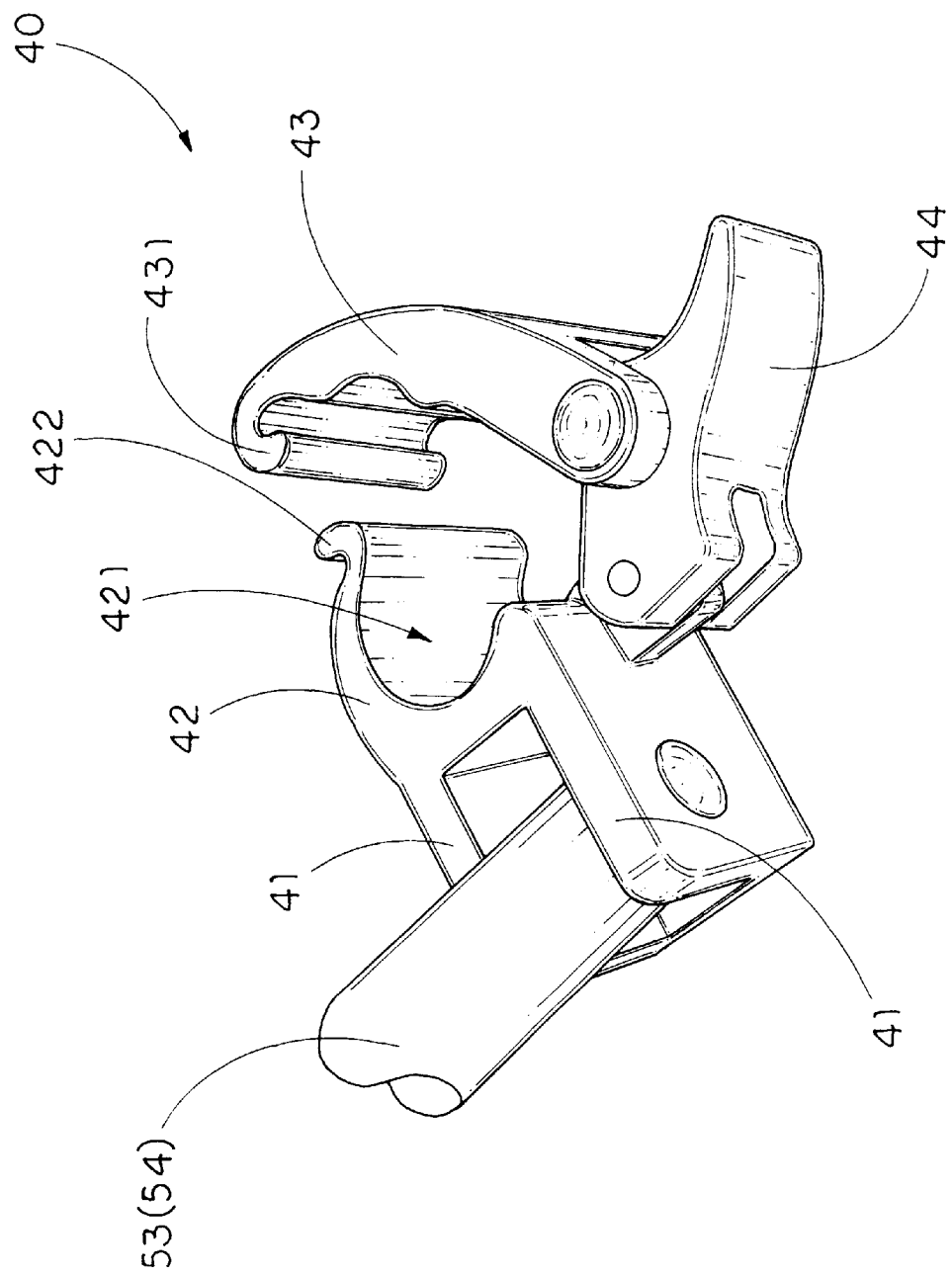
FIG. 5 is a perspective view of a connector of the universal accessory adapter for the collapsible outdoor furniture according to the above first preferred embodiment of the present invention.

As shown in FIG. 2, there are two connectors 40 pivotally connected to the inner ends of the first and second pivot arms 53, 54 respectively. Referring to FIG. 5, each connector 40 comprises two parallel walls 41 to pivotally connect the respective inner end of the first and second pivot arms 53, 54, a C-shaped locking body 42 defined a locking slot 421 for receiving the back frame leg 111 of the collapsible outdoor furniture 10 therein, a locker member 43 adapted to attach to the locking body 42 to enclose the locking slot 421, and an operative button 44 arranged to selectively engage and disengage the locker member 43 with the locking body 42.

Each of the locking slots 421 of the connectors 40 has a size slightly larger than a diameter of the back frame leg 111 of the collapsible outdoor furniture 10 in such a manner that the two connectors 40 are slidably and rotatably mounted on the back frame leg 111 of the collapsible outdoor furniture 10, so as to enhance the folding operation of the universal accessory adapter 20 with respect to the collapsible outdoor furniture 10. In other words, the supporting shaft 31 is adapted for turning with respect to the back frame leg 111 of the collapsible outdoor furniture 10 so as to adjust the position of the accessory item with respect to the seat frame 12 of the collapsible outdoor furniture 10.

Accordingly, the locking body 42 has a curved locking edge portion 422 and the locker member 43 has a hooking end portion 431 adapted for fittedly engaging with the locking edge portion 422 of the locking body 42, so as to securely receiving the back frame leg 111 in the locking slot 421 between the locking body 42 and the locker member 43, as shown in FIG. 5.

The universal accessory adapter 20 further comprises a stopper 60 for limiting the first and second pivot arms 53, 54 in a pivotally movable manner wherein the stopper 60 having a ring shaped is affixed to the supporting shaft 31 positioning between the first and second joints 51, 52. The stopper 60 is used to block and stop the sliding movement of the second joint 52 while unfolding and stretching out the foldable frame 50, so as to lock up the distance between the supporting shaft 31 and the back frame leg 111 of the collapsible outdoor furniture 10.

As shown in FIGS. 2 and 3, the supporting shaft 31 having a tubular shaped has a top end which is the adapter portion 311 for a post of a portable umbrella coaxially inserting thereto, wherein the supporting shaft 31 further comprises an adapter locker 312 provided on the top end thereof for securely locking up the post of the portable umbrella on the supporting shaft 31, so as to substantially support the portable umbrella on the supporting device 30 of the universal accessory adapter 20.

It is apparent that the portable umbrella can be replaced by other accessory items such as a side table or a flap having an elongated post. Moreover, the universal accessory adapter 20 of the present invention does not have to attach to the back frame 11 of the collapsible furniture 10 since the universal accessory adapter 20 can be attach to any conventional collapsible outdoor furniture having a vertical frame leg.

Therefore, by pivotally rotating the first and second pivot arms 53, 54, the supporting shaft 31 is capable of folding from the folded position to the unfolded position, as shown in FIGS. 4A, and 4B, wherein the second joint 52 and the connectors 40 will be slid along the supporting shaft 31 and the back frame leg 111 respectively. Since the foldable frame 50 is rigidly connected between the supporting shaft 31 and the collapsible outdoor furniture 10, an external force applied by the accessory item can be evenly distributed from the supporting shaft 31 to the collapsible outdoor furniture 10 through the foldable frame 50. Moreover, the user's weight applied on the collapsible outdoor furniture 10 will further ensure the rigid construction of the supporting shaft 31 for supporting the accessory item.

Figure 6:
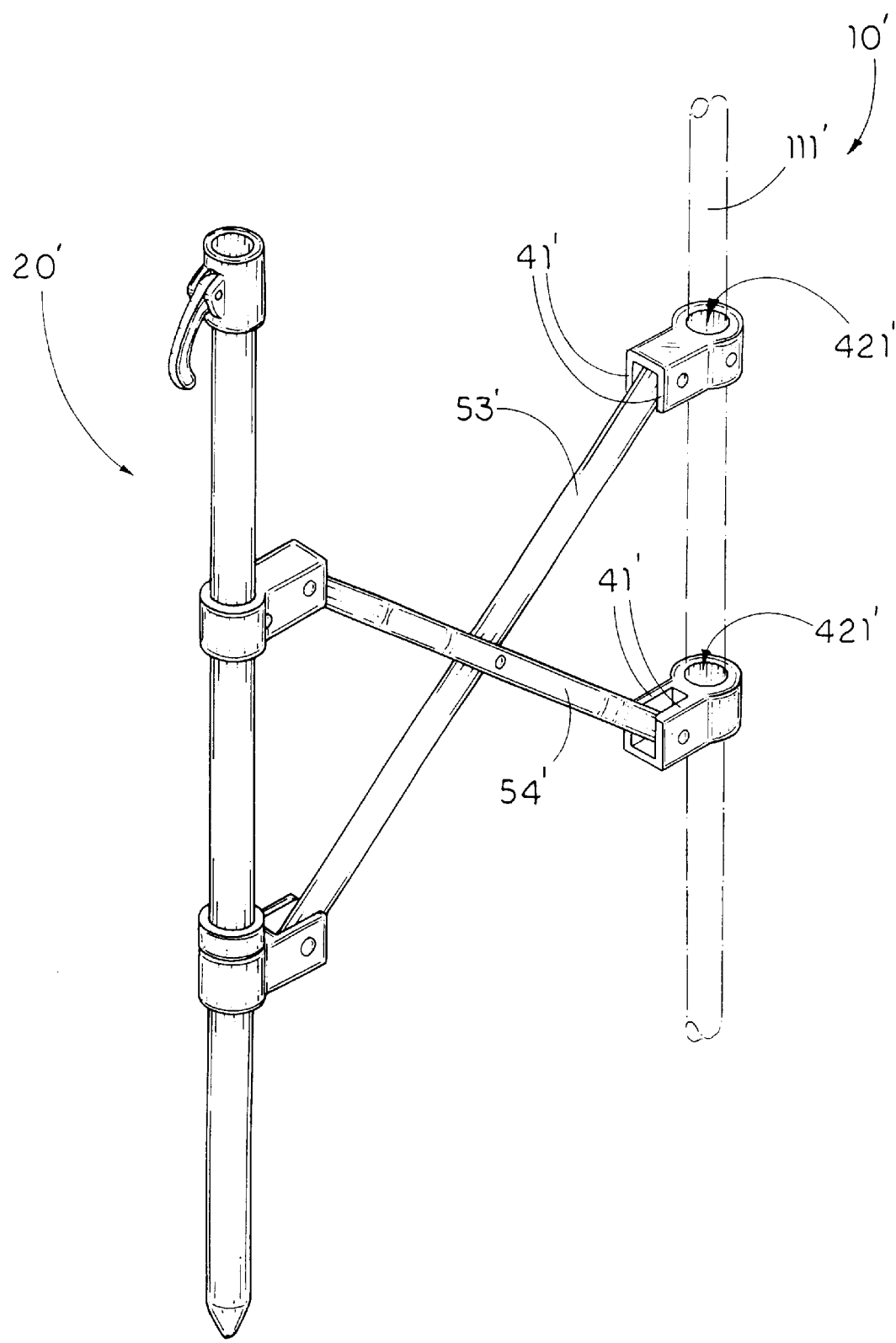
FIG. 6 is a perspective view of a universal accessory adapter incorporated with the collapsible outdoor furniture according to a second preferred embodiment of the present invention.

Referring to FIG. 6, a second embodiment of the present invention illustrates an alternative mode of the above first embodiment, wherein the universal accessory adapter 20' is built-in with the collapsible outdoor furniture 10'. In other words, the universal accessory adapter 20' is permanently affixed to the collapsible outdoor furniture 10'.

The universal accessory adapter 20' of the second embodiment has the exact same structure of that of the first embodiment, expecting the connectors 40'. As shown in FIG. 6, each connector 40' has a two parallel walls 41' to pivotally connect the respective inner end of the first and second pivot arms 53', 54', and a locking slot 421' for the back frame leg 111' of the collapsible outdoor furniture 10' slidably passing therethrough. Therefore, the two connectors 40' are permanently affixed to the frame leg 111' of the collapsible outdoor furniture 10', so as to prevent the universal accessory adapter 20' detaching from the collapsible outdoor furniture 10' accidentally.

Figure 7:
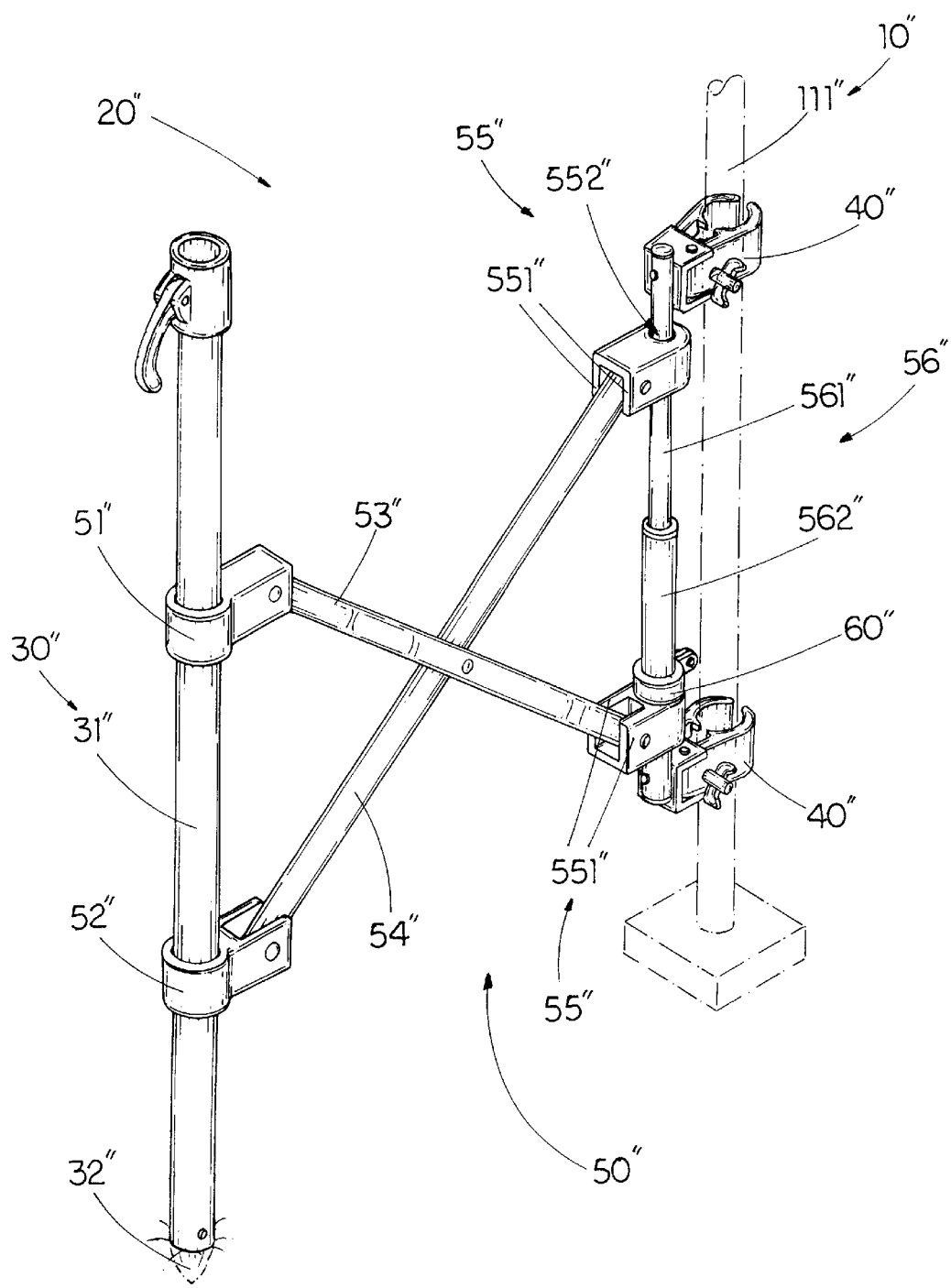
FIG. 7 is a perspective view of a universal accessory adapter incorporated with the collapsible outdoor furniture according to a third preferred embodiment of the present invention.

Referring to FIG. 7 of the drawings, a third embodiment of the universal accessory adapter 20" illustrates another alternative mode of the present invention, wherein the universal accessory adapter 20" is adapted for detachably mounting on the collapsible outdoor furniture 10" in an inclined manner. Thus, the first and the second joints 51", 52" are slidably connected to the supporting shaft 31" to adjust the folding position of the supporting shaft 31".

As shown in FIG. 7, the foldable frame 50" further comprises two sliding joints 55" pivotally connected to the two inner ends of the first and second pivot arms 53", 54" respectively and an adjustable arm 56" slidably connected to the two sliding joints 55" in a rotatably movable manner wherein the two connectors 40" are rotatably connected to two ends of the adjustable arm 56".

According to the third embodiment, the adjustable arm 56" comprises a first post 561" and a tubular second post 562" coaxially extended therefrom wherein the first post 561" has an outer diameter slightly larger than an inner diameter of the second post 562" in such a manner that the first post 561" is slidably inserted into the second post 562" in a rotatably movable manner. In other words, the adjustable arm 56" is capable of adjusting a length thereof by slidably extending the first post 561" towards to or away from the second post 562".

The two sliding joints 55" are slidably connected to the first post 561" and the second post 562" respectively wherein each of the sliding joints 55" has two parallel extensions 551" to pivotally connect the respective inner end of the first and second pivot arms 53", 54" and a sliding slot 552" for the respective first and second posts 561", 562" slidably passing therethrough.

It is worth to mention that the two sliding slots 552" has corresponding size to fit for the different diameters of the first and second posts 561", 562" respectively. One of the sliding slots 552" of the sliding joints 55" has a size slightly larger than the outer diameter of the first post 561" for fittedly connecting the first post 561" in a slidably movable manner. Another sliding slot 552" of the sliding joints 55" has a size slightly larger than an outer diameter of the second post 562" for fittedly connecting the second post 562" in a slidably movable manner.

Figure 8A:
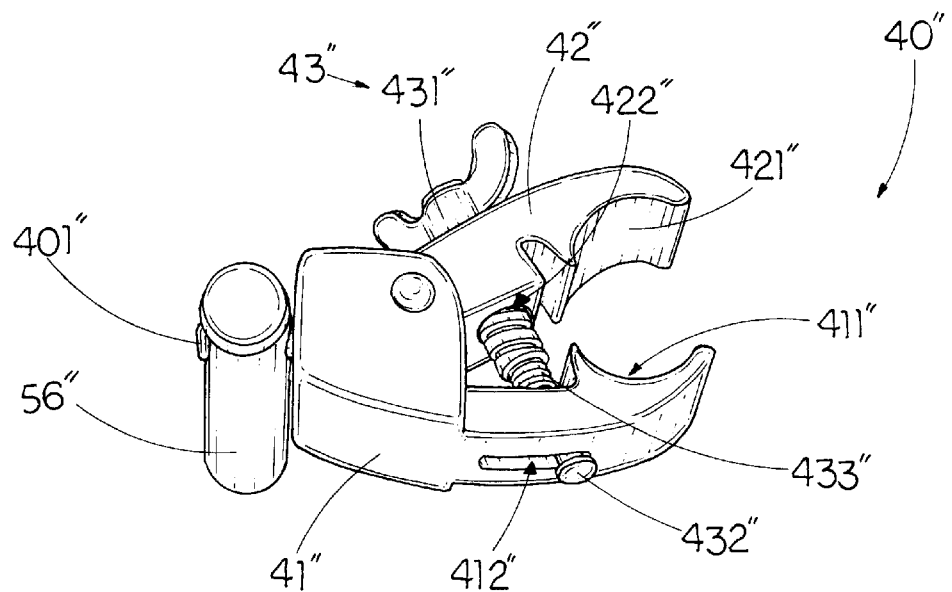
FIG. 8A illustrates a connector of the universal accessory adapter in an opened position according to the above third preferred embodiment of the present invention.
Figure 8B:
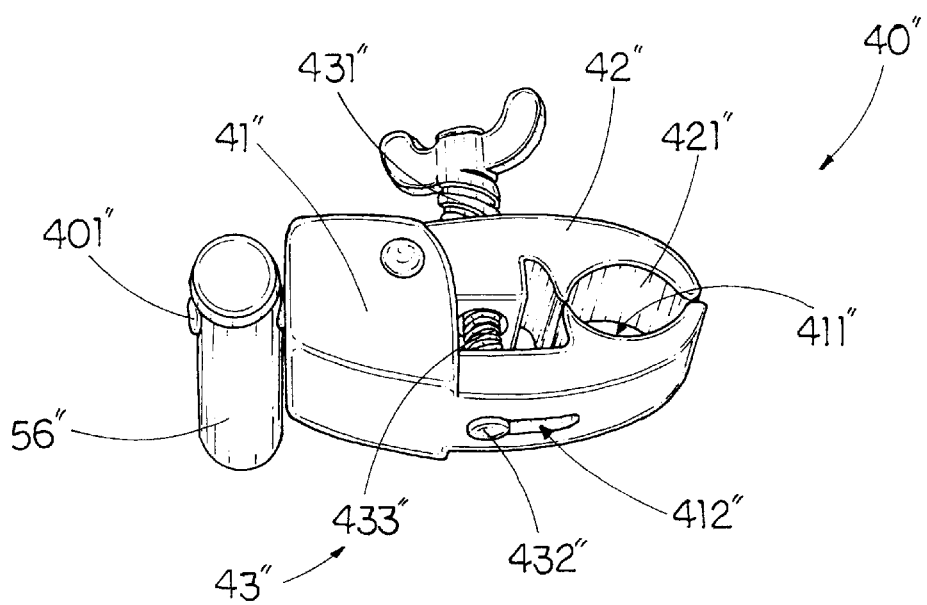
FIG. 8B illustrates the connector of the universal accessory adapter in a closed position according to the above third preferred embodiment of the present invention.

Each connectors 40" comprises a first mounting member 41" having an inner first mounting surface 411" and an elongated slot 412", a second mounting member 42", having an inner second mounting surface 421" and a screwing hole 422", pivotally connected to the first mounting member 41" to form a pivot V-shape structure, and an adjustable screw 43" rotatably extended from the screwing hole 421" of the second mounting member 42" to the elongated slot 412" of the first mounting member 42" for selectively adjusting the two mounting members 41", 42" from an opened position to a closed position. In which, in the opened position, as shown in FIG. 8A, the two mounting surfaces 411", 421" of the mounting members 41", 42" are moved away from each other and in the closed position, as shown in FIG. 8B, the two mounting surfaces 411", 421" are moved towards to each other for securely clamping the frame leg 111" of the collapsible outdoor furniture 10" therebetween.

According to the third embodiment, each of the two connectors 40" are rotatably connected to a top end of the first post 561" and a bottom end of the second post 562" respectively via a rivet 401" wherein the rivet 401" is transversely and rotatably penetrated through the respective first and second posts 561", 562" to the pivot end of the second mounting member 42" of the connecter 40", so as to ensure the rotational movement of the connector 40" with respect to the adjustable arm 56". Thus, the two connectors 40" mounted on the two ends of the adjustable arm 56" can prevent the first and second posts 561", 562" sliding out of the two sliding slots 551" of the sliding joints 55" respectively.

Figure 9:
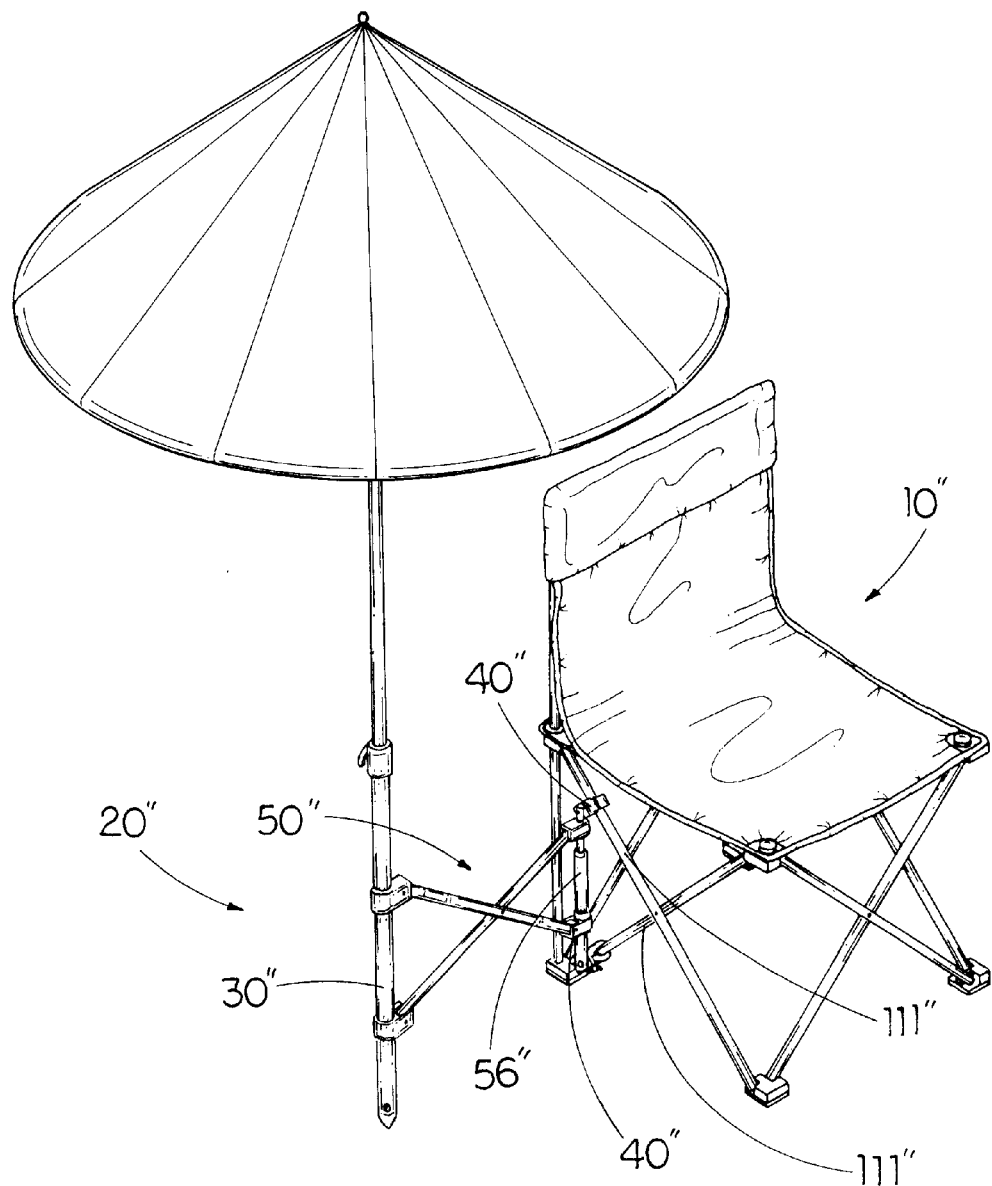
FIG. 9 illustrates the universal accessory adapter mounted on the collapsible outdoor furniture according to the above third preferred embodiment of the present invention.

As shown in FIGS. 8 and 9, the adjustable screw 43" comprises a screw head 431" having an inner thread portion for rotatably inserting into the screwing hole 422" having an inner thread portion of the second mounting member 42" and an elongated screw body 432" having an enlarged free end extended to the elongated slot 412" of the first mounting member 41" in such a manner that the screw head 431" is arranged to driven rotatably to move the two mounting members 41", 42" between the opened position and the closed position.

The adjustable screw 43" further comprises a resilient element 433" provided between the first and second mounting members 41", 42" for applying an urging force therebetween, so as to retain the first and second members 41", 42" in the opened position. Accordingly, the resilient element 433", which is a compression spring coaxially mounted on the screw body 432", has two ends biasing against the first and second mounting members 41", 42" respectively and is arranged to normally urge and retain the first and second mounting members 41", 42" to pivotally move away from each other.

Accordingly, the elongated slot 412" of the first mounting member 41" has a predetermined length adapted for the free end of the screw body 432" moving from one end to another end with respect to the opened position and the closed position of the connector 40" respectively.

As shown in FIG. 7, the universal accessory adapter 20" further comprises a stopper 60" for limiting the respective sliding joint 55" sliding on the second post 562" of the adjustable arm 56". The stopper 60" having a ring-shaped is mounted on the second post 562" of the adjustable arm 56" such that the respective sliding joint 55" is adapted for sliding on the second post 562" between the respective connector 40" and the stopper 60", so as to limit the sliding movement of the sliding joint 55".

FIG. 9 illustrates the universal accessory adapter 20" is capable of mounting on any kind of collapsible outdoor furniture 10". Due to the free rotational movement of the two connectors 40" with respect to the foldable frame 50", the two connectors 40" are capable of detachably mounting on two different frame legs 111 of the collapsible outdoor furniture 10". In other words, the universal accessory adapter 20" can not only mount on the back frame 11" but also mount on the seat frame 12" of the collapsible outdoor furniture 10".

Figure 10:
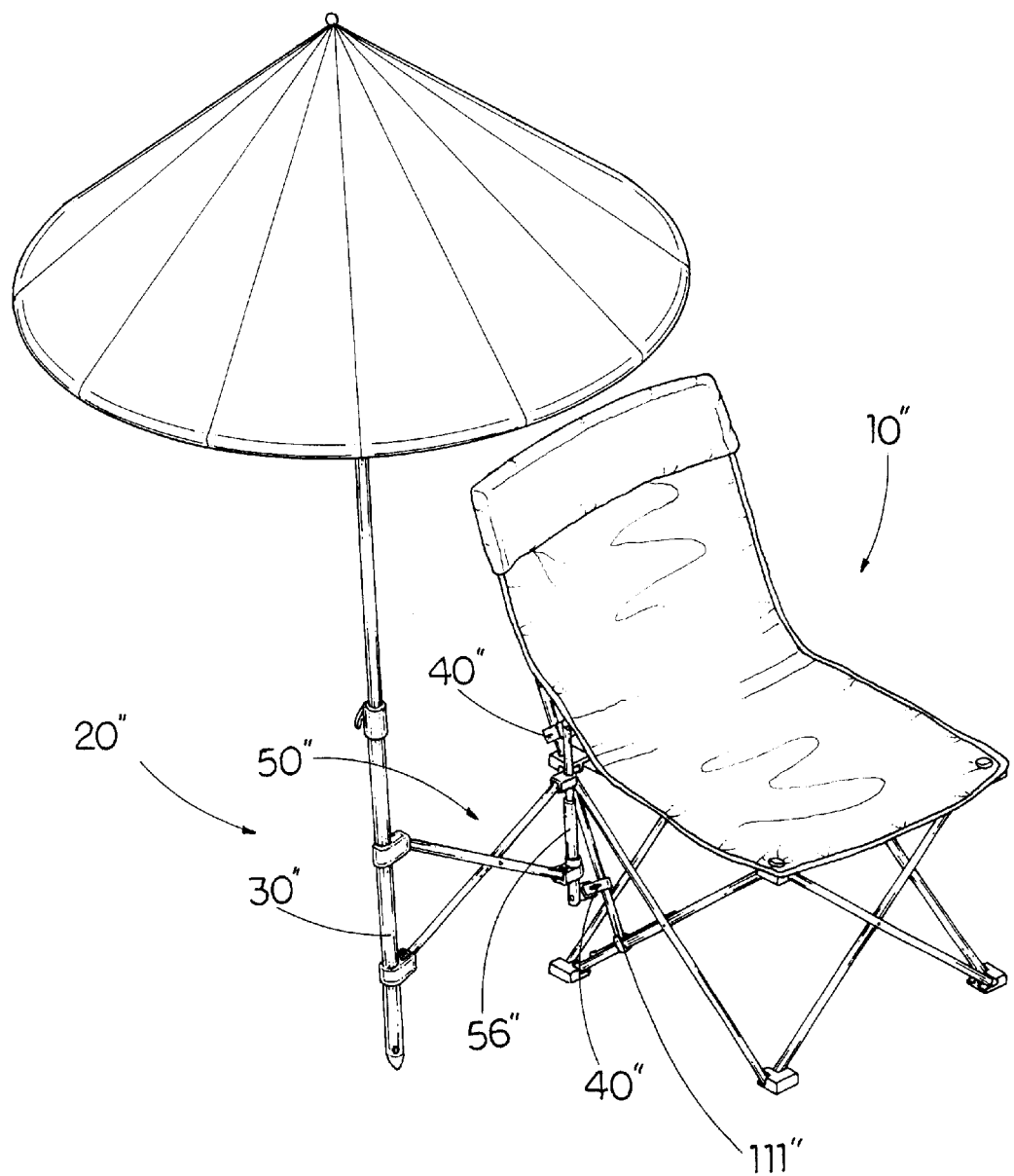
FIG. 10 illustrates the universal accessory adapter mounted on the collapsible outdoor furniture with another position according to the above third preferred embodiment of the present invention.

Moreover, the universal accessory adapter 20" can also mount on the collapsible outdoor furniture 10" having an inclined frame leg 111, as shown in FIG. 10. Since the collapsible outdoor furniture 10" can incorporated with an inclined back frame 11" for providing an inclined back support for the user, the universal accessory adapter 20" can incorporated with such structural design of the collapsible outdoor furniture 10" without altering the original structure thereof. In other words, the universal accessory adapter 20" of the present invention can be attached to all kinds of collapsible outdoor furniture 10" having a frame leg 111" for rigidly supporting the accessory item. It is worth to mention that the supporting shaft 31" can be inclinedly and rigidly supported on the ground by adjusting the positions of the connectors 40" with respect to the collapsible outdoor furniture 10" for providing an optimum shading angle when the umbrella is supported on the supporting shaft 31".

In view of above, the universal accessory adapter of the present invention can substantially achieve the following features and advantages:

1. It is adapted to be used with the collapsible outdoor furniture, so as to rigidly support an accessory item such as an umbrella, a side table, or the like.

2. When the universal accessory adapted is arranged to detachably attach to a vertical frame leg, such as the back leg of the chair frame of a foldable chair or the stand leg of the table frame of a foldable table, the foldable chair or table is still able to be operated to fold-up or unfold while the universal accessory adapter is still attached thereto. In other words, the user may select to let the universal accessory adapter remains attaching to the collapsible outdoor furniture all the time, no matter it is unfolded for use or folded up for storage or transportation, i.e. the universal accessory adapter can become an attached component of the collapsible outdoor furniture.

3. The universal accessory can be quickly and easily folded into a compact unit for carriage and storage, and unfolded for use.

4. The universal accessory adapter for collapsible outdoor furniture has a simple construction that every individual is able to operate the universal accessory adapter in a folding and an unfolding manner.

5. The universal accessory adapter does not require to alter the original structural design of the collapsible outdoor furniture, so as to minimize the manufacturing cost of incorporating the universal accessory adapter with every conventional outdoor furniture having a vertical back frame leg.

6. The weight of the user applied on the collapsible outdoor furniture will further ensure the construction of the universal accessory adapter for rigidly support an accessory item thereon.

7. No expensive or complicate mechanical structure is required to employ in the present invention in order to achieve the above mentioned objects. Therefore, the present invention successfully provides an economic and efficient solution for rigidly supporting by the collapsible outdoor furniture and providing a reinforced support configuration to support the desired accessory item.

What is claimed is:

1. A universal accessory adapter for a collapsible outdoor furniture which comprises at least a frame leg, wherein said universal accessory adapter comprises:

a supporting device arranged for supporting an accessory item;

at least a connector for detachably attaching said supporting device to said frame leg of said collapsible outdoor furniture; and a foldable frame connected between said supporting device and said connector for selectively folding said supporting device from a folded position to an unfolded position, wherein in said folded position, said supporting device is moved to a position close to said frame leg of said collapsible outdoor furniture, and in said unfolded position, said supporting device is moved away from said frame leg of said collapsible outdoor furniture, wherein said supporting device is able to be spacedly mounted with respect to said frame leg of said collapsible outdoor furniture so as to support said accessory item with a distance apart from said collapsible outdoor furniture.

2. A universal accessory adapter, as recited in claim 1, wherein said supporting device comprises an elongated supporting shaft and a ground support provided on a bottom end of said supporting shaft for biasing against a ground when said supporting shaft is in said unfolded position.

3. A universal accessory adapter, as recited in claim 2, wherein said foldable frame comprises a first joint affixed to said supporting shaft, a second joint slidably attached to said supporting shaft, and first and second pivot arms pivotally connected with each other in cross manner to form a "X" structure, wherein each of said first and second pivot arms has an outer end pivotally connected to said first and second joints respectively and an inner end pivotally connected to said connecter.

4. A universal accessory adapter, as recited in claim 3, wherein said first and second joints are identical and each of said first and second joints has a sliding through hole for said supporting shaft slidably passing through, wherein two parallel arms are pivotally connected between said outer ends of said first and second pivot arms and said first and second joints respectively, wherein said first joint is securely affixed to said supporting shaft via a rivet to prevent any unwanted movement of said first joint along said supporting shaft.

5. A universal accessory adapter, as recited in claim 2, wherein said connector is pivotally connected to a respective inner end of one of first and second pivot arms and has a locking slot for rotatably and slidably receiving said frame leg of said collapsible outdoor furniture therethrough, so as to mount said supporting device rotatably about said frame leg of said collapsible outdoor furniture.

6. A universal accessory adapter, as recited in claim 4, wherein said connector is pivotally connected to said respective inner end of said first and second pivot arms and has a locking slot for rotatably and slidably receiving said frame leg of said collapsible outdoor furniture therethrough, so as to mount said supporting device rotatably about said frame leg of said collapsible outdoor furniture.

7. A universal accessory adapter, as recited in claim 6, wherein said connector further comprises a C-shaped locking body which defines said locking slot, a locker member adapted to attach to said locking body to enclose said locking slot, and an operative button arranged to selectively engage and disengage said locker member with said locking body.

8. A universal accessory adapter, as recited in claim 7, wherein said locking slot has a size slightly larger than a diameter of said frame leg of said collapsible outdoor furniture in such a manner that said connector is adapted for slidably and rotatably mounting on said frame leg of said collapsible outdoor furniture.

9. A universal accessory adapter, as recited in claim 3, further comprising a stopper for limiting said first and second pivot arms in a pivotally movable manner wherein said stopper having a ring shaped affixed to said supporting shaft positioning between said first and second joints.

10. A universal accessory adapter, as recited in claim 6, further comprising a stopper for limiting said first and second pivot arms in a pivotally movable manner wherein said stopper having a ring shaped affixed to said supporting shaft positioning between said first and second joints.

11. A universal accessory adapter, as recited in claim 8, further comprising a stopper for limiting said first and second pivot arms in a pivotally movable manner wherein said stopper having a ring shaped affixed to said supporting shaft positioning between said first and second joints.

12. A universal accessory adapter, as recited in claim 4, further comprising another connector, wherein said foldable frame further comprises two sliding joints pivotally connected to said two inner ends of said first and second pivot arms respectively and an adjustable arm slidably connected to said two sliding joints in a rotatably movable manner wherein said two connectors are rotatably connected to two ends of said adjustable arm.

13. A universal accessory adapter, as recited in claim 12, wherein said adjustable arm comprises a first post and a tubular second post coaxially extended therefrom, wherein said first post has an outer diameter slightly larger than an inner diameter of said second post and said first post is slidably inserted into said second post in a rotatably movable manner, so as to adjust a length of said adjustable arm by slidably extending said first post towards and away from said second post.

14. A universal accessory adapter, as recited in claim 13, wherein said two sliding joints are slidably connected to said first post and said second post respectively, wherein said sliding joints, each having two parallel extensions and a sliding slot, are pivotally connected with said inner ends of said first and second pivot arms respectively while said first and second posts slidably passing through said sliding slots, wherein one of said sliding slots of said sliding joints has a size slightly larger than an outer diameter of said first post for fittedly connecting said first post in a slidably movable manner and another of said sliding slots of said sliding joints having a size slightly larger than an outer diameter of said second post for fittedly connecting said second post in a slidably movable manner.

15. A universal accessory adapter, as recited in claim 12, wherein each of said two connectors comprises a first mounting member having an inner first mounting surface and an elongated slot, a second mounting member, having an inner second mounting surface and a screwing hole, pivotally connected to said first mounting member to form a pivot V-shape structure, and an adjustable screw rotatably extended from said screwing hole of said second mounting member to said elongated slot of first mounting member for selectively adjusting said two mounting members from an opened position to a closed position, wherein in said opened position, said two mounting surfaces of said mounting members are moved away from each other, and in said closed position, said two mounting surfaces are moved towards to each other for securely clamping said frame leg of said collapsible outdoor furniture therebetween.

16. A universal accessory adapter, as recited in claim 15, wherein said adjustable screw comprises a screw head having an inner thread portion for rotatably inserting into said screwing hole having an inner thread portion of said second mounting member and an elongated screw body having an enlarged free end extended to said elongated slot of said first mounting member in such a manner that said screw head is arranged to be driven rotatably to move said two mounting members between said opened position and said closed position.

17. A universal accessory adapter, as recited in claim 16, wherein said adjustable screw further comprises a resilient element provided between said first and second mounting members for applying an urging force therebetween, so as to retain said first and second members in said opened position.

18. A universal accessory adapter, as recited in claim 17, wherein said resilient element, which is a compression spring coaxially mounted on said screw body, has two ends biasing against said first and second mounting members respectively and is arranged to normally urge and retain said first and second mounting members to pivotally move away from each other.

19. A universal accessory adapter, as recited in claim 18, wherein said elongated slot of the first mounting member has a predetermined length adapted for said free end of the screw body moving from one end to another end with respect to said opened position and said closed position of said connector respectively.

20. A collapsible outdoor furniture, comprising:
a plurality of frame legs foldably constructed to form a collapsible frame; and
a universal accessory adapter, which is arranged to securely attach to at least one of said frame legs of said collapsible frame, comprising:
a supporting device for rigidly supporting an accessory item;
at least a connector for detachably attaching said supporting device to said frame leg of said collapsible outdoor furniture; and
a foldable frame connected between said supporting device and said connector for selectively folding said supporting device from a folded position to an unfolded position, wherein in said folded position, said supporting device is moved to a position close to said frame leg of said collapsible outdoor furniture, and in said unfolded position, said supporting device is moved away from said frame leg of said collapsible outdoor furniture, wherein said supporting device is able to be spacedly mounted with respect to said frame leg of said collapsible outdoor furniture so as to support said accessory item with a distance apart from said collapsible outdoor furniture.

21. A collapsible outdoor furniture, as recited in claim 20, wherein said supporting device comprises an elongated supporting shaft and a ground support provided on a bottom end of said supporting shaft for biasing against a ground when supporting shaft is in said unfolded position.

22. A collapsible outdoor furniture, as recited in claim 21, wherein said foldable frame comprises a first joint affixed to said supporting shaft, a second joint slidably attached to said supporting shaft, and first and second pivot arms pivotally connected with each other in cross manner to form a "K" structure, wherein each of said first and second pivot arms has an outer end pivotally connected to said first and second joints respectively and an inner end pivotally connected to said connecter.

23. A collapsible outdoor furniture, as recited in claim 22, wherein said first and second joints are identical and each of said first and second joints has a sliding through hole for said supporting shaft slidably passing through, wherein two parallel arms are pivotally connected between said outer ends of said first and second pivot arms and said first and second joints respectively, wherein said first joint is securely affixed to said supporting shaft via a rivet to prevent any unwanted movement of said first joint along said supporting shaft.

24. A collapsible outdoor furniture, as recited in claim 22, wherein said connector is pivotally connected to said respective inner end of said first and second pivot arms and has a locking slot for rotatably and slidably receiving said frame leg of said collapsible outdoor furniture therethrough, so as to mount said supporting device rotatably about said frame leg of said collapsible outdoor furniture.

25. A collapsible outdoor furniture, as recited in claim 23, wherein said connector is pivotally connected respective inner end of said first and second pivot arms and has a locking slot for rotatably and slidably receiving said frame leg of said collapsible outdoor furniture therethrough, so as to mount said supporting device rotatably about said frame leg of said collapsible outdoor furniture.

26. A collapsible outdoor furniture, as recited in claim 25, wherein said locking slot has a size slightly larger than a diameter of said frame leg of said collapsible outdoor furniture in such a manner that said connector is adapted for slidably and rotatably mounting on said frame leg of said collapsible outdoor furniture.

27. A collapsible outdoor furniture, as recited in claim 22, further comprising a stopper for limiting said first and second pivot arms in a pivotally movable manner wherein said stopper having a ring shaped affixed to said supporting shaft positioning between said first and second joints.

28. A collapsible outdoor furniture, as recited in claim 26, further comprising a stopper for limiting said first and second pivot arms in a pivotally movable manner wherein said stopper having a ring shaped affixed to said supporting shaft positioning between said first and second joints.

29. A collapsible outdoor furniture, as recited in claim 23, further comprising another connector, wherein said foldable frame further comprises two sliding joints pivotally connected to said two inner ends of said first and second pivot arms respectively and an adjustable arm slidably connected to said two sliding joints in a rotatably movable manner wherein said two connectors are rotatably connected to two ends of said adjustable arm.

30. A collapsible outdoor furniture, as recited in claim 29, wherein said adjustable arm comprises a first post and a tubular second post coaxially extended therefrom, wherein said first post has an outer diameter slightly larger than an inner diameter of said second post and said first post is slidably inserted into said second post in a rotatably movable manner, so as to adjust a length of said adjustable arm by slidably extending said first post towards and away from said second post.

31. A collapsible outdoor furniture, as recited in claim 30, wherein said two sliding joints are slidably connected to said first post and said second post respectively, wherein said sliding joints, each having two parallel extensions and a sliding slot, are pivotally connected with said inner ends of said first and second pivot arms respectively while said first and second posts slidably passing through said sliding slots, wherein one of said sliding slots of said sliding joints has a size slightly larger than an outer diameter of said first post for fittedly connecting said first post in a slidably movable manner and another of said sliding slots of said sliding joints having a size slightly larger than an outer diameter of said second post for fittedly connecting said second post in a slidably movable manner.

32. A collapsible outdoor furniture, as recited in claim 29, wherein each of said two connectors comprises a first mounting member having an inner first mounting surface and an elongated slot, a second mounting member, having an inner second mounting surface and a screwing hole, pivotally connected to said first mounting member to form a pivot V-shape structure, and an adjustable screw rotatably extended from said screwing hole of said second mounting member to said elongated slot of first mounting member for selectively adjusting said two mounting members from an opened position to a closed position, wherein in said opened position, said two mounting surfaces of said mounting members are moved away from each other, and in said closed position, said two mounting surfaces are moved towards each other for securely clamping said frame leg of said collapsible outdoor furniture therebetween.

33. A collapsible outdoor furniture, as recited in claim 32, wherein said adjustable screw comprises a screw head having an inner thread portion for rotatably inserting into said screwing hole having an inner thread portion of said second mounting member and an elongated screw body having an enlarged free end extended to said elongated slot of said first mounting member in such a manner that said screw head is arranged to be driven rotatably to move said two mounting members between said opened position and said closed position.

34. A collapsible outdoor furniture, as recited in claim 33, wherein said adjustable screw further comprises a resilient element provided between said first and second mounting members for applying an urging force therebetween, so as to retain said first and second members in said opened position.

35. A collapsible outdoor furniture, as recited in claim 34, wherein said resilient element, which is a compression spring coaxially mounted on said screw body, has two ends biasing against said first and second mounting members respectively and is arranged to normally urge and retain said first and second mounting members to pivotally move away from each other.

36. A collapsible outdoor furniture, as recited in claim 35, wherein said elongated slot of the first mounting member has a predetermined length adapted for said free end of the screw body moving from one end to another end with respect to said opened position and said closed position of said connector respectively.

* * * * *